(12) United States Patent
Kempf et al.

(10) Patent No.: US 11,487,118 B2
(45) Date of Patent: Nov. 1, 2022

(54) RENDERED OPTICAL SUPER RESOLUTION DISPLAY

(71) Applicant: TEXAS INSTRUMENTS INCORPORATED, Dallas, TX (US)

(72) Inventors: Jeffrey Matthew Kempf, Dallas, TX (US); John Peter Fenske, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/122,040

(22) Filed: Dec. 15, 2020

(65) Prior Publication Data

US 2021/0356744 A1  Nov. 18, 2021

Related U.S. Application Data

(60) Provisional application No. 63/024,385, filed on May 13, 2020.

(51) Int. Cl.
*G02B 27/01* (2006.01)
*G09G 5/391* (2006.01)

(52) U.S. Cl.
CPC ......... *G02B 27/0172* (2013.01); *G09G 5/391* (2013.01); *G02B 2027/014* (2013.01); *G09G 2340/0457* (2013.01)

(58) Field of Classification Search
CPC .......... G02B 27/0172; G02B 2027/014; G02B 27/017; G09G 5/391; G09G 2340/0457; G09G 2340/0407; G09G 3/20; G09G 3/007
See application file for complete search history.

(56) References Cited

U.S. PATENT DOCUMENTS

| | | | |
|---|---|---|---|
| 2005/0225571 A1* | 10/2005 | Collins | G09G 3/007 345/660 |
| 2007/0058087 A1 | 3/2007 | Kettle et al. | |
| 2009/0295422 A1 | 12/2009 | Hamer et al. | |

(Continued)

FOREIGN PATENT DOCUMENTS

| | | |
|---|---|---|
| EP | 2456204 A1 | 5/2012 |
| KR | 101692747 B1 | 1/2017 |

OTHER PUBLICATIONS

International Search Report datedb Jul. 29, 2021, PCT Application No. PCT/US2021/031894, 3 pages.

(Continued)

*Primary Examiner* — Brent D Castiaux
(74) *Attorney, Agent, or Firm* — Michelle F. Murray; Charles A. Brill; Frank D. Cimino

(57) ABSTRACT

A method includes rendering, by at least one processor, a first sub-frame of an image, where the first sub-frame includes a first subset of pixels of the image. The method includes displaying the first sub-frame on a display. The method also includes rendering, by the at least one processor, a second sub-frame of the image, where the second sub-frame includes a second subset of pixels of the image, and where the second sub-frame is shifted a half-pixel diagonally from the first sub-frame. The method also includes displaying the second sub-frame on the display after displaying the first sub-frame, where the display is optically shifted a half-pixel diagonally to display the second sub-frame.

20 Claims, 8 Drawing Sheets

(56) References Cited

U.S. PATENT DOCUMENTS

| | | | |
|---|---|---|---|
| 2016/0321980 A1* | 11/2016 | Matsumoto | G09G 3/2044 |
| 2018/0096458 A1 | 4/2018 | Wilson et al. | |
| 2018/0366058 A1 | 12/2018 | Gu et al. | |
| 2019/0019328 A1 | 1/2019 | Yeoh et al. | |
| 2019/0227261 A1 | 7/2019 | Smith | |
| 2020/0018965 A1* | 1/2020 | Milner-Moore | G06T 11/40 |

OTHER PUBLICATIONS

Written Opinion dated Jul. 29, 2021, PCT Application No. PCT/US2021/031894, 5 pages.

* cited by examiner

RENDERED OPTICAL SUPER RESOLUTION DISPLAY

CROSS-REFERENCE TO RELATED APPLICATIONS

The present application claims priority to U.S. Provisional Patent Application No. 63/024,385, which was filed May 13, 2020, is titled "Rendered Optical Super Resolution Display," and is hereby incorporated herein by reference in its entirety.

BACKGROUND

Augmented reality (AR) and virtual reality (VR) systems provide simulated experiences that can be similar to or different from the real world. VR systems can be used for entertainment or education purposes. VR systems use either VR headsets or multi-projected environments to generate realistic images, sounds and other sensations that simulate a user's physical presence in a virtual environment. AR is an interactive experience of a real-world environment where the objects that reside in the real world are enhanced by computer-generated perceptual information, sometimes across multiple human senses, such as sight, sound, or touch.

SUMMARY

In accordance with at least one example of the disclosure, a method includes rendering, by at least one processor, a first sub-frame of an image, where the first sub-frame includes a first subset of pixels of the image. The method includes displaying the first sub-frame on a display. The method also includes rendering, by the at least one processor, a second sub-frame of the image, where the second sub-frame includes a second subset of pixels of the image, and where the second sub-frame is shifted a half-pixel diagonally from the first sub-frame. The method also includes displaying the second sub-frame on the display after displaying the first sub-frame, where the display is optically shifted a half-pixel diagonally to display the second sub-frame.

In accordance with at least one example of the disclosure, a system includes a processing unit configured to render a first sub-frame of an image, where the first sub-frame includes a first subset of pixels of the image. The processing unit is also configured to apply an anti-aliasing filter to the first subset of pixels. The processing unit is configured to transmit the first sub-frame. The processing unit is also configured to render a second sub-frame of the image, where the second sub-frame includes a second subset of pixels of the image, and where the second sub-frame is shifted a half-pixel diagonally from the first sub-frame. The processing unit is also configured to apply the anti-aliasing filter to the second subset of pixels, and transmit the second sub-frame.

In accordance with at least one example of the disclosure, a system includes a headset that includes a display and a graphics processing unit (GPU). The GPU is configured to render a first sub-frame of an image, where the first sub-frame includes a first subset of pixels of the image. The GPU is also configured to render a second sub-frame of the image, where the second sub-frame includes a second subset of pixels of the image, where the second sub-frame is shifted a half-pixel diagonally from the first sub-frame. The headset also includes a spatial light modulator (SLM). The SLM is configured to receive the first sub-frame from the GPU and project the first sub-frame to the display. The SLM is also configured to receive the second sub-frame from the GPU and project the second sub-frame to the display, where the display is optically shifted by a half-pixel diagonally to display the second sub-frame relative to displaying the first sub-frame.

BRIEF DESCRIPTION OF THE DRAWINGS

For a detailed description of various examples, reference will now be made to the accompanying drawings in which.

DETAILED DESCRIPTION

AR effects are commonly created by headsets that include a head-mounted display with a small display screen in front of the eyes. One way to enhance the user experience is to increase the resolution of this display. One method for increasing resolution includes adding pixels to the display device, but more pixels increases the size and cost of the system. For an AR or VR headset that uses batteries, battery life may also be reduced when using a display with a higher number of pixels.

Examples herein utilize optical super resolution (OSR) to increase the perceived resolution of a display. A processor, such as a graphics processing unit (GPU), renders image frames that are spatially offset from one another. In an example, a first frame has no offset, and a second frame is offset by ½ pixel horizontally and ½ pixel vertically relative to the first frame. The GPU alternates between frames with no offset and frames with a ½ pixel by ½ pixel offset relative to the non-offset frames. In addition, in some examples an anti-aliasing scheme is applied to each rendered frame to reduce artifacts associated with down-sampling the frames. By cycling through these spatially offset frames quickly, the perceived resolution of the display for the viewer is higher than the native resolution of the display. In other examples, more than two spatially offset frames can be used.

Figure 1:
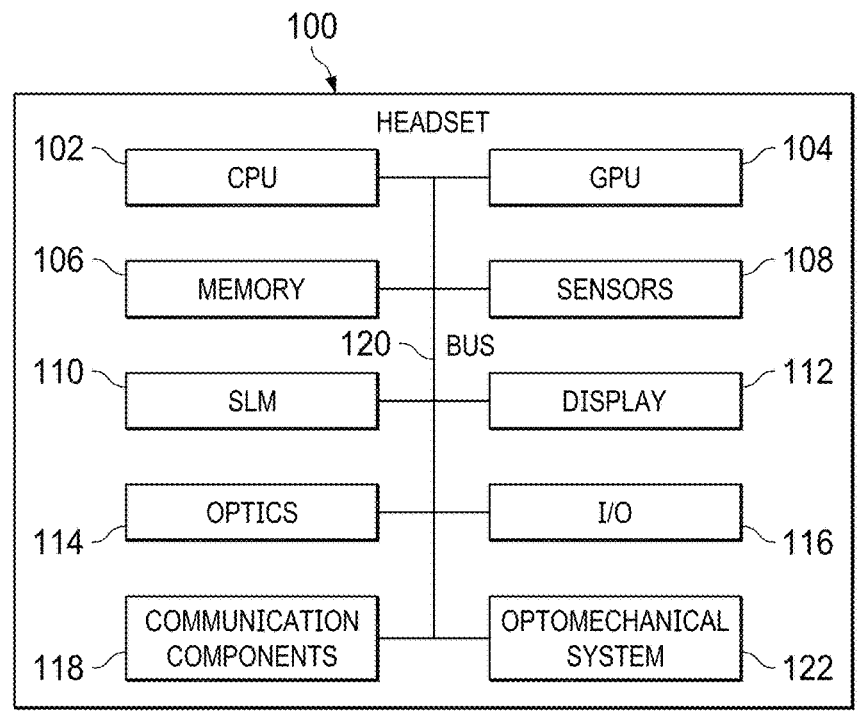
FIG. 1 is a schematic diagram of an AR system in accordance with various examples.

FIG. 1 is a schematic diagram of an AR system in accordance with various examples. Headset 100 is a head-mounted device that displays image or video data to a user. Examples herein are set forth in the context of a head-mounted display, but non-head-mounted displays are used in other examples. Headset 100 includes a central processing unit (CPU) 102 that provides processing capabilities. Headset 100 also includes GPU 104 that creates and renders images for display. Memory 106 stores data, such as image and video data. Memory 106 can also store instructions for CPU 102 and/or GPU 104. Sensors 108 are any sensors that are used to detect information about the environment, the headset 100, or the user. Examples of sensors 108 include hardware that detects spatial and motion information, such as position, orientation, rotation, velocity, and acceleration. Sensors 108 may also include infrared, pyroelectric, ultrasonic, microphone, laser, optical, capacitive sensors, acoustic sensors, and/or inductive sensors.

Headset 100 includes a spatial light modulator (SLM) 110. One type of SLM in an example is a digital micromirror device (DMD). A DMD is a micro-electrical-mechanical system (MEMS) that has on its surface an array of several hundred thousand or millions of microscopic mirrors. Each micromirror corresponds to a pixel in an image that is projected onto the micromirrors and then reflected from the micromirrors to a display 112. Other types of SLMs that could be used in some examples are liquid crystal display (LCD) systems or liquid crystal on silicon (LCoS) systems. Display 112 could be any suitable type of viewing surface. Display 112 could include a waveguide optical element to provide a near eye display for headset 100 in one example. Optics 114 includes any lenses, prisms, or other optical components used to create an image for display in headset 100. Input/Output (I/O) 116 includes any interface for coupling headset 100 to another device, such as a console or a computer (not shown in FIG. 1). I/O 116 may also include one or more input devices, such as a keyboard, mouse, controller, or any other suitable device for receiving action requests and communicating the received action requests. Communication components 118 include any components that enable communication between headset 100 and one or more communication networks. In some examples, the communication components 118 include hardware capable of data communications using any of a variety of wireless protocols (e.g., Wi-Fi, Bluetooth, cellular, etc.), wired protocols, and/or any other suitable communication protocol. Headset 100 also includes bus 120 that connects the components in headset 100 and allows for communication between the components. Headset 100 includes an optomechanical system 122. Optomechanical system 122 can include an actuator in one example. An actuator displaces or offsets the display in a vertical and/or a horizontal direction by a predetermined distance for each frame. For example, a first frame may have no offset, while the display is displaced for the second frame, by the actuator, by ½ pixel horizontally and ½ pixel vertically relative to the first frame. The GPU alternates between frames with no offset and frames with a ½ pixel by ½ pixel offset relative to the non-offset frames, with the actuator displacing the display in the appropriate amount and direction for each frame, in synchronization with the GPU. If more than two spatially offset frames are used, the actuator displaces the display for each frame in the appropriate manner to display the frames. In another example, an optical element in headset 100 may be displaced instead of the display, such as a mirror or lens. In another example, a glass plate in a light path in headset 100 can be shifted by the actuator.

In an example, OSR is performed within a closed rendered ecosystem. In a closed ecosystem, the sources for display are rendered within a single device, such as headset 100. GPU 104 in headset 100 renders sources for display on display 112 that is also in headset 100. GPU 104 therefore is programmed to render sources for the particular hardware within headset 100. In examples herein, SLM 110 is a spatial light modulator that includes an array of micromirrors that is sized 1280 columns by 720 rows. SLM 110 outputs an image for display on display 112 that is 1280 pixels by 720 pixels in size. Arrays of other sizes are used in other examples. The final images that are displayed are therefore sized 1280×720. However, images of greater resolution are rendered by GPU 104. In this example, GPU 104 renders images with pixels of 2560 columns by 1440 rows at 150 Hertz (Hz), which is four times as many pixels as the 1280×720 display. Two or more spatially offset frames of size 1280×720 are created from the 2560×1440 rendered image frames, and the spatially offset frames are then displayed to the viewer quickly enough that the viewer does not perceive any flicker between the slightly offset frames. Displaying all of the spatially offset frames at a 60 Hz rate or faster generally prevents the human eye from perceiving flicker, because the eye acts as a temporal lowpass filter and combines the separate frames into one perceived image. A rate of 60 Hz is equivalent to 16.67 milliseconds, so both of the spatially offset frames are displayed within a time window of 16.67 milliseconds. In an example herein, two spatially offset frames are displayed within the time window of 16.67 milliseconds or less. If four spatially offset frames are used in another example, all four spatially offset frames are displayed within the time window of 16.67 milliseconds.

In an example, the 1280×720 spatially offset frames are created by taking a sub-sample of the 2560×1440 supersample pixels rendered by GPU 104. The 1280×720 pixels that are selected for the sub-frame are in a quincunx arrangement. A quincunx is a geometric pattern including five points arranged in a cross, with four of the points forming a square or rectangle and a fifth point at the center of the square or rectangle. In this example, the four pixels forming a square or rectangle are pixels of a first sub-frame and the fifth pixel in the center is a pixel of a second sub-frame. Another way to describe the pixels selected for the sub-frame is a checkerboard pattern. The sub-frames are described in FIG. 2 below.

A first sub-frame of 1280×720 pixels is created by selecting a first subset of pixels that includes every other pixel in each row and every other pixel in each column of the first 2560×1440 rendered frame. A second sub-frame of 1280×720 pixels is created by shifting down one row and over one column, and then again selecting a second subset of pixels that includes every other pixel in each row and every other pixel in each column of the first 2560×1440 rendered frame. The first sub-frame contains ¼ of the pixels in the first 2560×1440 frame, and the second sub-frame also contains ¼ of the pixels in the first 2560×1440 frame. The other ½ of the pixels in the first 2560×1440 frame are not used in the sub-frames, but are used for anti-aliasing purposes as described below. If four sub-frames are created rather than two sub-frames in another example, each of the four sub-frames contains ¼ of the pixels in the 2560×1440 frame, and every pixel in the first 2560×1440 frame is used across the four sub-frames.

Figure 2:
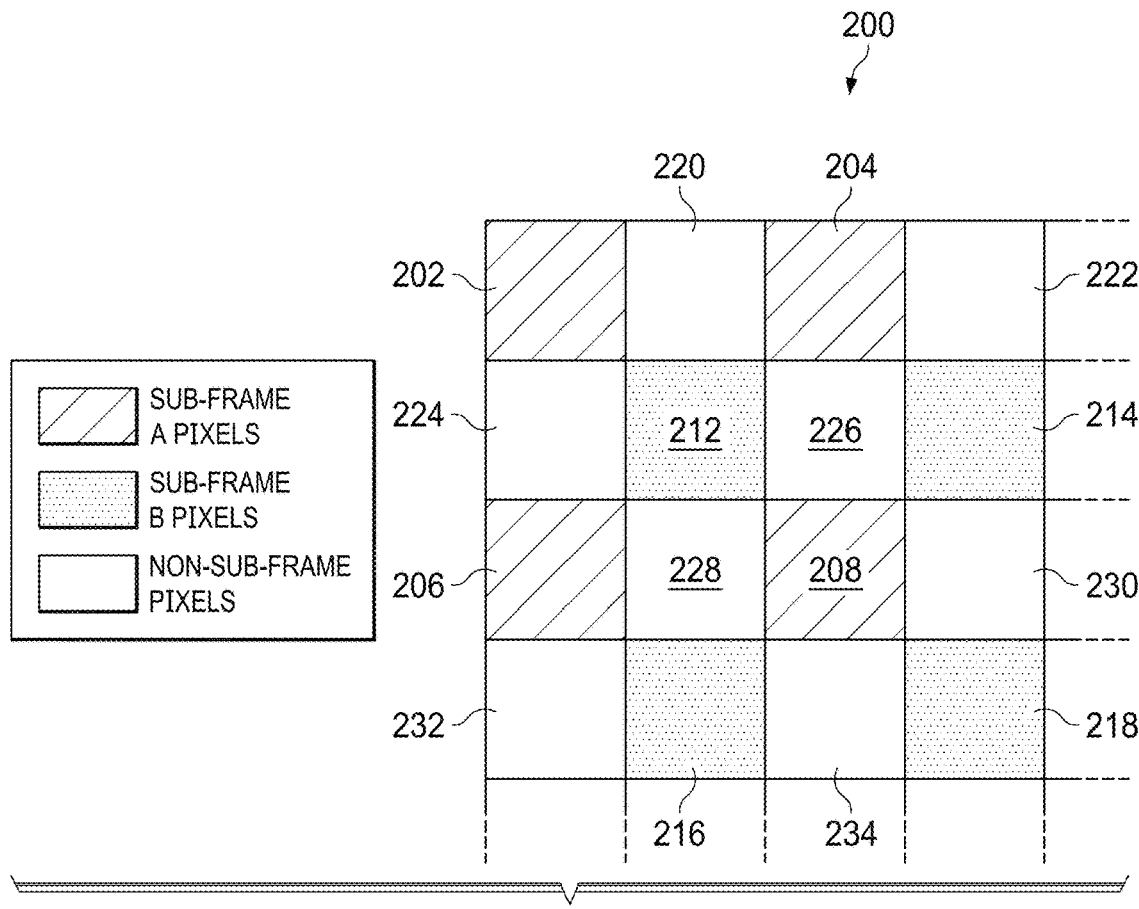
FIG. 2 is a schematic diagram of pixels of a rendered frame in accordance with various examples.

FIG. 2 is a schematic diagram of pixels 200 of a rendered frame in accordance with various examples. Pixels 200 are a sample of the pixels of a 2560×1440 frame containing a rendered image for display. Sixteen of the 2560×1440 pixels are shown in FIG. 2. Pixels 202, 204, 206, and 208 are pixels of sub-frame A. Sub-frame A contains a first subset of 1280×720 pixels, but only four pixels are shown here for simplicity. Pixels of sub-frame A occupy every other row and every other column in the "quincunx" or "checkerboard" arrangement as shown. In the quincunx arrangement, pixels 202, 204, 206, and 208 form a square, and the fifth pixel in the center is pixel 212, which is a pixel of subframe B. Pixel 202 is shown in the first row and first column in this sample of pixels. Pixel 204 is in the first row, third column. Pixel 206 is in the third row, first column. Pixel 208 is in the third row, third column. The pixels in sub-frame A make up the first subset of pixels selected from the full 2560×1440 image. To produce an image for display on display 112 in headset 100, GPU 104 processes the 1280×720 pixels of sub-frame A to produce an image for display. Because sub-frame A is the first frame, sub-frame A is referred to as an "odd" frame. GPU 104 will alternate the display of odd and even frames to produce an OSR image.

Pixels 212, 214, 216, and 218 are pixels of sub-frame B. Sub-frame B also contains a second subset of 1280×720 pixels just like sub-frame A, but only four pixels are shown here for simplicity. In the quincunx arrangement, pixels 212, 214, 216, and 218 form a square, and the fifth pixel in the center is pixel 208, which is a pixel of subframe A. Pixels of sub-frame B occupy every other row and every other column in the checkerboard or quincunx arrangement as shown. The pixels of sub-frame B are shifted one row down and one column right from the pixels of sub-frame A. For example, pixel 212 is shifted one row down and one column to the right of pixel 202, and so forth for every pixel of sub-frame B. The pixels in sub-frame B make up the second subset of pixels selected from the full 2560×1440 image. Because sub-frame B is the second frame, sub-frame B is referred to as an "even" frame.

Pixels 220, 222, 224, 226, 228, 230, 232, and 234 are non-sampled pixels of the 2560×1440 frame that are not used in either sub-frame A or sub-frame B. Even though these pixels are not sampled for a sub-frame for display, these non-sampled pixels are used for anti-aliasing as described below. If four sub-frames were used rather than two-sub frames, these non-sampled pixels would be part of a third or fourth sub-frame, in another example that is described below.

In operation, GPU 104 and other suitable components first process the pixels for sub-frame A. The pixels that make up sub-frame A are sampled from the first frame of the 2560× 1440 rendering (pixels 202, 204, 206, 208, and so on). An anti-aliasing filter is applied to the sub-frame A pixels to remove aliasing artifacts caused by the removal of the non-sampled pixels (220, 222, 224, etc.), in a process that is described below. After filtering, GPU 104 transmits the 1280×720 pixels of sub-frame A to the 1280×720 SLM 110 and associated circuitry and optics 114. SLM 110 receives the pixels of sub-frame A and projects the pixel information of sub-frame A for display.

GPU 104 and other suitable components then process the pixels for sub-frame B. Note that due to multithreading, hyperthreading, and other techniques, processing of the pixels for sub-frame A and sub-frame B may occur simultaneously or even out of order. For sub-frame B, the pixels that make up sub-frame B are sampled from the first frame of the 2560×1440 rendering (pixels 212, 214, 216, 218, and so on). The anti-aliasing filter is applied to the pixels of sub-frame B, and then GPU 104 transmits the 1280×720 pixels of sub-frame B to the 1280×720 SLM 110 and associated circuitry and optics 114. SLM 110 receives the pixels of sub-frame B and projects the pixel information of sub-frame B for display. The sub-frame B pixels will be optically shifted one row down and one column to the right compared to the sub-frame A pixels, because of the position of the sub-frame B pixels relative to the position of the sub-frame A pixels in FIG. 2.

After sub-frame B is processed and displayed, the process continues again with sub-frame A, where samples are taken from the second frame of the 2560×1440 rendering, filtered, and displayed. Sub-frame B is then sampled from the second frame of the 2560×1440 rendering, filtered, and displayed. Sub-frames A and B continue being displayed in an alternating manner as samples are taken from each subsequent frame of the 2560×1440 rendering.

As described above, several spatially offset frames that are combined quickly enough are perceived by the human observer as providing an increased system resolution. The spatial positions are cycled through in a relatively fast integration period so the observer does not perceive the individual sub-frames, which would produce flicker artifacts. If all the spatial positions are completed at a rate of 60 Hz or faster, the flicker artifacts will be eliminated. Therefore all spatial positions should be completed in 16.67 milliseconds or faster. The rate at which an observer perceives flicker is known as the critical flicker fusion threshold. The critical flicker fusion threshold is proportional to the field of view. In some VR or AR headsets, the display 112 produces a large image by filling a large angular extent of the field of view of the observer. The field of view may be as wide as 40 degrees or more in one example. For wide fields of view, faster integration periods are needed to prevent observed flicker. With a field of view of 40 degrees and above, an integration period of 75 or 90 Hz can provide better results than 60 Hz. In the example in FIG. 2, two spatial positions are shifted by ½ pixel diagonally. Both spatial positions are rendered and displayed in a period that is faster than the critical flicker fusion period (e.g., 75 Hz). If the sub-frames are generated at 150 Hz, the integration of the two sub-frames occurs at half of that rate, or 75 Hz. Generating the two sub-frames at 150 Hz provides an integration period of 75 Hz for each of the two sub-frames, which is fast enough to prevent or reduce perceived flicker.

Figure 3:
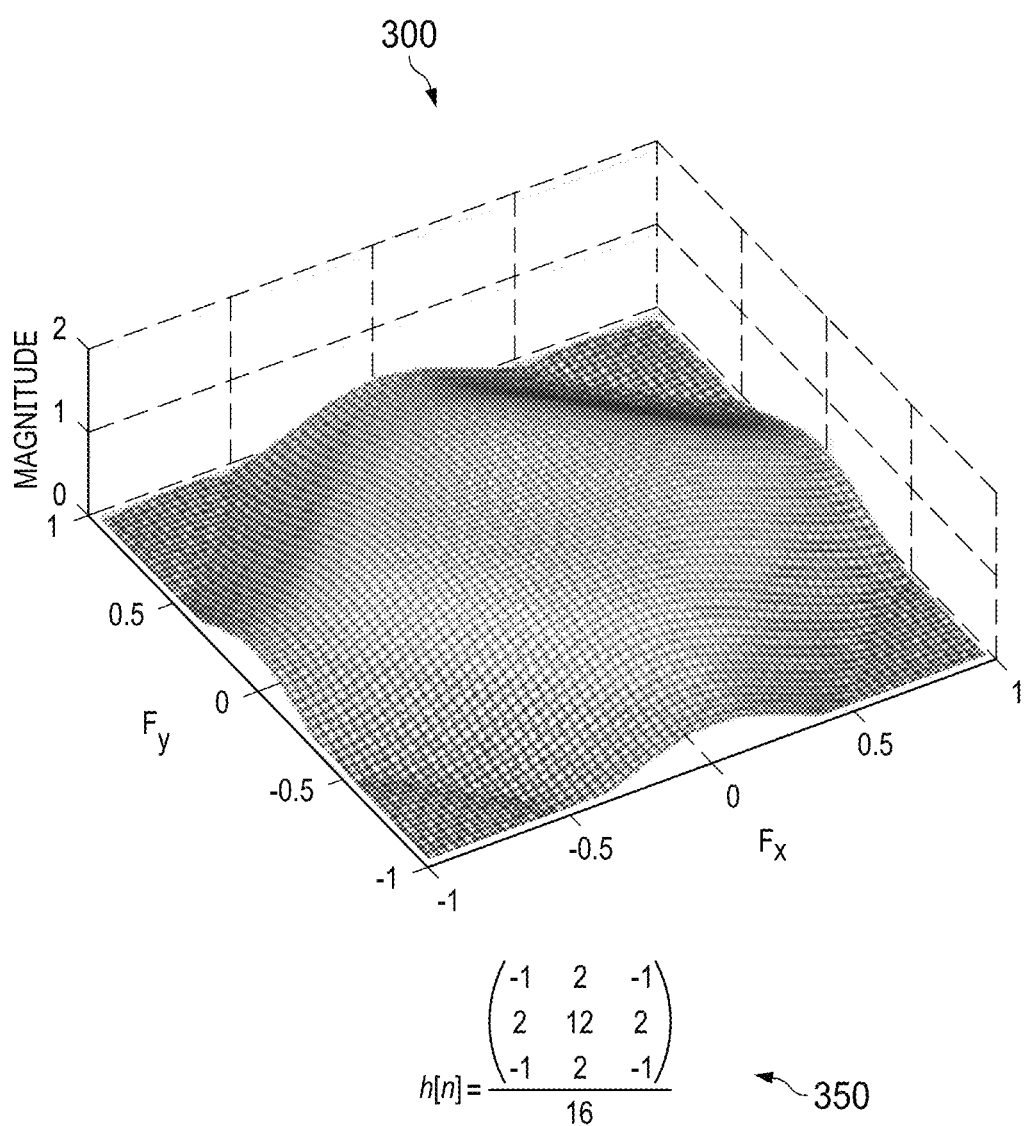
FIG. 3 is a diamond passband anti-aliasing filter in accordance with various examples.

FIG. 3 is a diamond passband anti-aliasing filter according to an example. Graph 300 is a visual representation of the diamond passband filter. Equation 350 shows one example of coefficients for a 3×3 finite impulse response (FIR) filter. In the example described above, 2560×1440 samples are rendered, which is four times as many samples as the number of micromirrors in the SLM 110 array. For sub-frame A, ¼ of the pixels are selected (pixels 202, 204, 206, 208, etc.). For sub-frame B, ¼ of the pixels are selected (pixels 212, 214, 216, 218, etc.). The other remaining pixels are not sampled (pixels 220, 222, 224, 226, etc.). Because the remaining pixels are not sampled, frequencies associated with those pixels are not represented in the samples that make up sub-frames A and B. Because those frequencies are not represented, the diamond passband filter is used on each of the sampled pixels of sub-frames A and B to eliminate the frequencies and prevent or reduce aliasing artifacts.

Equation 350 is one example of the coefficients for the diamond passband filter. The diamond passband filter acts as a weighted sum. For example, for a 3×3 group of pixels, the first pixel is multiplied by $-1/16$, the second pixel is multiplied by $2/16$, the third pixel is multiplied by $-1/16$, the center pixel is multiplied by $12/16$, etc., for all nine pixels. Those nine products are summed to produce a single weighted sum, and the pixel that is at the center of the 3×3 grid is replaced by the weighted sum. The filter eliminates the frequencies associated with the non-sampled pixels, which are diagonal frequencies in frequency space for the pixel at the center of the 3×3 grid.

As one example of the operation of the diamond passband filter, pixel 212 of sub-frame B is selected to be filtered by the diamond passband filter. Pixel 212 is the center pixel of the 3×3 grid. A weighted sum is computed for pixel 212 and the pixels that surround pixel 212 using the coefficients in the 3×3 grid in equation 350. The nine pixels weighted as follows: pixel 202 is multiplied by −1/16, pixel 220 is multiplied by 2/16, pixel 204 is multiplied by −1/16, pixel 224 is multiplied by 2/16, pixel 212 is multiplied by 12/16, pixel 226 is multiplied by 2/16, pixel 206 is multiplied by −1/16, pixel 228 is multiplied by 2/16, and pixel 208 is multiplied by −1/16. This weighted sum then replaces pixel 212, the center pixel in the 3×3 grid. The same filter is applied to each pixel in sub-frame B before the samples that make up sub-frame B are sent to SLM 110 for display. This filtering process eliminates aliasing artifacts caused by the missing pixels (such as pixels 220, 224, 226, and 228).

Each pixel in sub-frame A is filtered before sub-frame A is passed to SLM 110, and each pixel in sub-frame B is filtered before sub-frame B is passed to SLM 110. Other filter coefficients can be used in other examples. In one example GPU 104 performs the filtering operations to take advantage of the GPU 104's multithreading capabilities.

Figure 4:
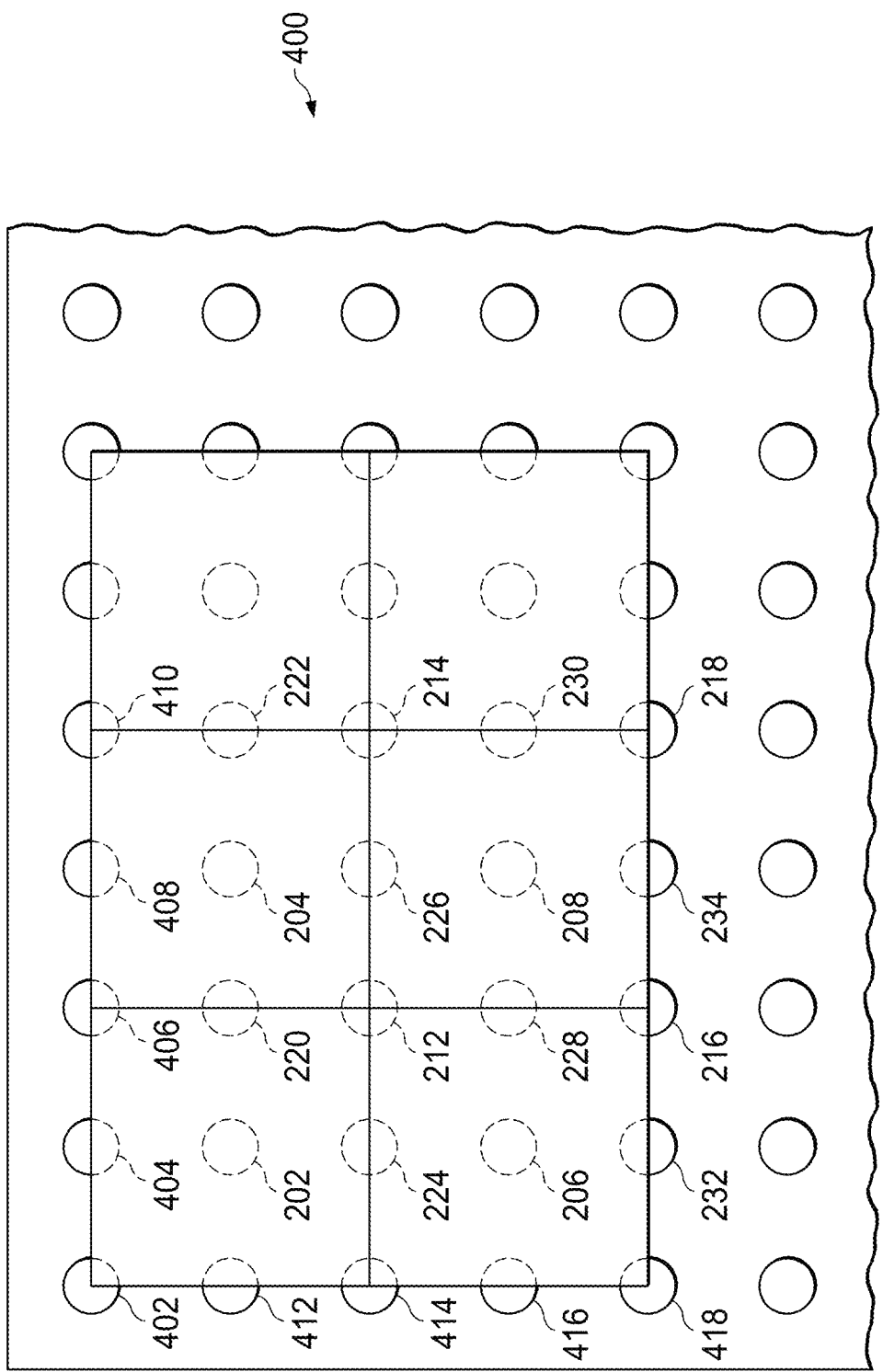
FIG. 4 is a filter span across super samples in accordance with various examples.

FIG. 4 shows an example filter span 400 across super samples according to an example. Filter span 400 shows the diamond passband filter for sub-frame A pixels. Pixels 202, 204, 206, and 208 are shown as each being the center pixel of a 3×3 grid. The diamond passband filter as described above with respect to FIG. 3 is applied to each of the pixels 202, 204, 206, 208, and every other pixel of sub-frame A. For example, applying the diamond passband filter to pixel 202 includes weighting pixels 402, 404, 406, 412, 202, 220, 414, 224, and 212 according to the filter coefficients. Applying the diamond passband filter to pixel 204 includes weighting pixels 406, 408, 410, 220, 204, 222, 212, 226, and 214. Applying the diamond passband filter to pixel 206 includes weighting pixels 414, 224, 212, 416, 206, 228, 418, 232, and 216. Applying the diamond passband filter to pixel 208 includes weighting pixels 212, 226, 214, 228, 208, 230, 216, 234, and 218. Similar filtering is performed on each of the 1280×720 pixels in sub-frame A.

Figure 5:
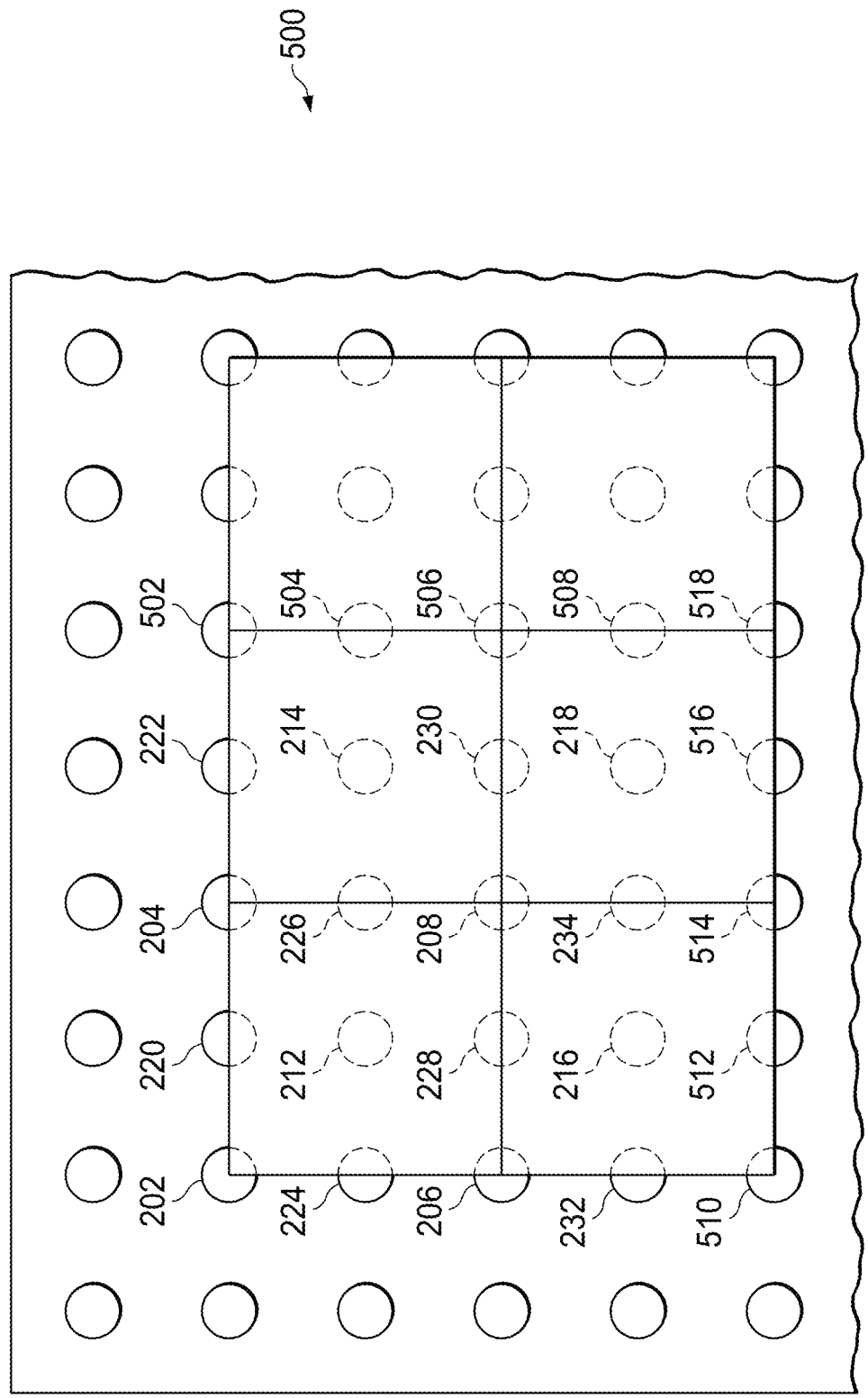
FIG. 5 is a filter span across super samples in accordance with various examples.

FIG. 5 shows an example filter span 500 across super samples according to an example. Filter span 500 shows the diamond passband filter for sub-frame B pixels. Pixels 212, 214, 216, and 218 are shown as each being the center pixel of a 3×3 grid. The diamond passband filter as described above with respect to FIG. 3 is applied to each of the pixels 212, 214, 216, 218, and every other pixel of sub-frame B. For example, applying the diamond passband filter to pixel 212 includes weighting pixels 202, 220, 204, 224, 212, 226, 206, 228, and 208 according to the filter coefficients in equation 350. Applying the diamond passband filter to pixel 214 includes weighting pixels 204, 222, 502, 226, 214, 504, 208, 230, and 506. Applying the diamond passband filter to pixel 216 includes weighting pixels 206, 228, 208, 232, 216, 234, 510, 512, and 514. Applying the diamond passband filter to pixel 218 includes weighting pixels 208, 230, 506, 234, 218, 508, 514, 516, and 518. Similar filtering is performed on each of the 1280×720 pixels in sub-frame B. FIGS. 4 and 5 show how the diamond passband filter is applied differently to the pixels of the odd frames (sub-frame A) and the even frames (sub-frame B). For the odd frames, the filter begins on pixel 202. For the even frames, the filter begins on pixel 212 which is offset diagonally by ½ a pixel pitch from pixel 202.

Figure 6:
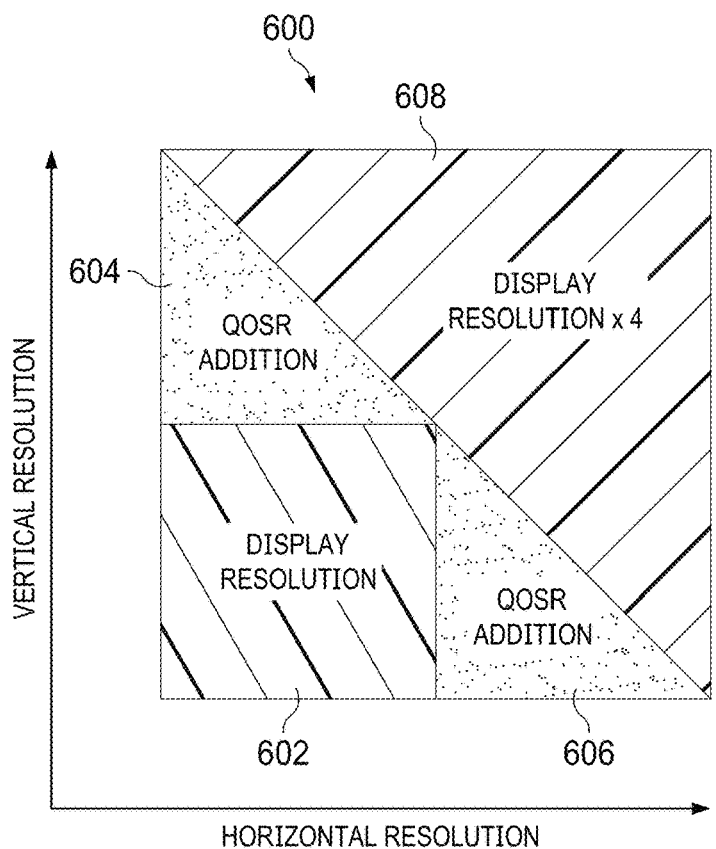
FIG. 6 is a graph of the results of optical super resolution in accordance with various examples.

FIG. 6 is a graph 600 of the results of optical super resolution according to an example. Graph 600 shows results using a two-position super resolution architecture, as described above, with the downstream SLM 110 optically shifted by ½ a pixel pitch diagonally. The resolution of the display is shown in the bottom left corner of graph 600, and labeled 602. The resolution of the display in one example is 1280×720. Using OSR and optical shifting by ½ pixel diagonally, triangles 604 and 606 can be added. The vertical resolution and the horizontal resolution of the system are doubled. Finally, triangle 608 can be added to the resolution capability of the system if a four-position super resolution architecture is used, as described below. In an example, a four-position architecture would result in a resolution of 2560×1440 pixels.

Figure 7:
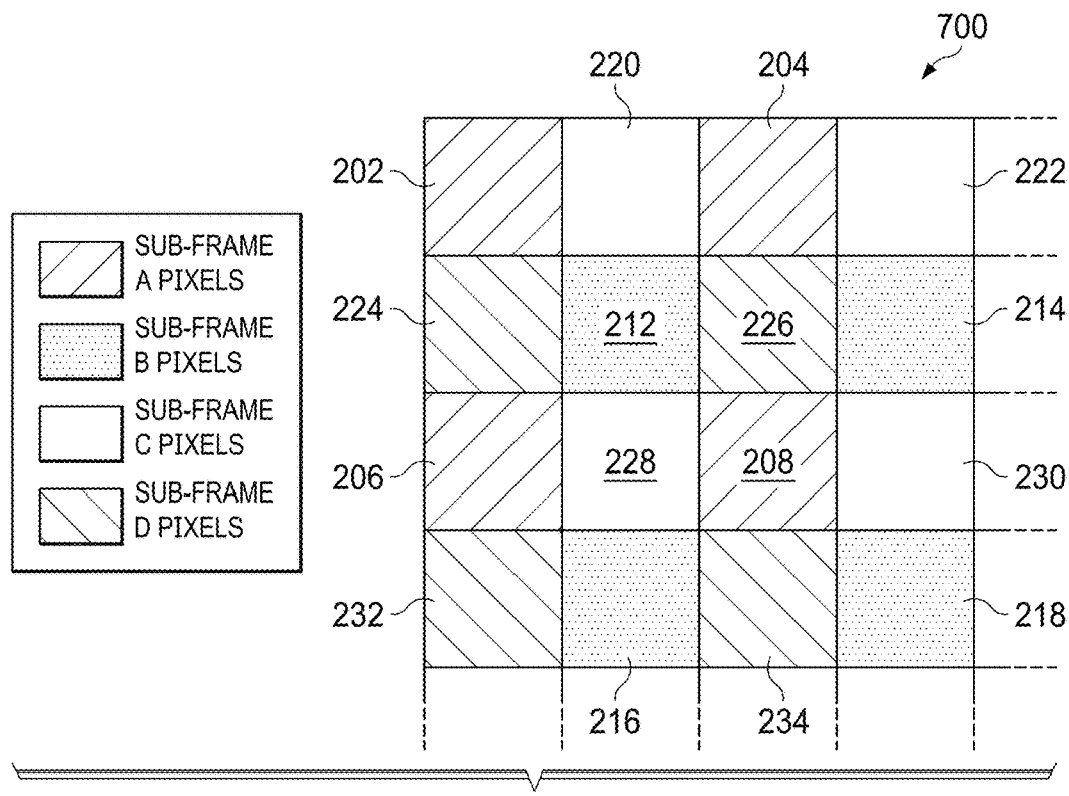
FIG. 7 is a schematic diagram of pixels of a rendered frame in accordance with various examples.

FIG. 7 is a schematic diagram of pixels 700 of a rendered frame in accordance with various examples. Pixels 700 are a sample of pixels of a 2560×1440 frame containing a rendered image for display. Sixteen of the 2560×1440 pixels are shown in FIG. 7. FIG. 7 shows an example of a four-position super resolution architecture that uses four sub-frames rather than two sub-frames as in the example above. Because four sub-frames are used, every pixel of the 2560×1440 frame is used rather than one-half of the pixels as described above with respect to FIG. 2.

In the four-position super resolution architecture, pixels 202, 204, 206, and 208 are the first subset of pixels that make up the first sub-frame A. Pixels 212, 214, 216 and 218 are the second subset of pixels that make up the second sub-frame B. Pixels 220, 222, 228, and 230 are the third subset of pixels that make up the third sub-frame C. Pixels 224 226, 232, and 234 are the fourth subset of pixels that make up the fourth sub-frame D. Each sub-frame includes one-fourth of the pixels of the full-resolution frame.

As with the example above with respect to FIG. 2, the sub-frames in FIG. 7 are composed of alternating pixels in the checkerboard pattern. In this example, four sub-frames are sent to SLM 110 sequentially, each with a different spatial offset. The four sub-frames are sent to the SLM 110 and displayed with the optical shift at a fast enough rate to prevent a viewer from perceiving flicker. Because four sub-frames are used, the perceived resolution of the display is four times the actual resolution of the display. Using optical super resolution as described herein, a display of size 1280×720 would appear to a user to be a display with a resolution of 2560×1440. The display would appear to have the full resolution as shown in FIG. 6.

The sub-frames in the four-position super resolution architecture of FIG. 7 are transmitted to SLM 110 in any suitable order. GPU 104 transmits the sub-frames to SLM 110 after they are rendered. SLM 110 receives the sub-frames and modulates the pixels of SLM 110 for display on display 112. In an example, sub-frame A is displayed first, followed by an optical shift to the right by one pixel to display sub-frame C. Then the display is shifted down one pixel for sub-frame B. Finally, the display is shifted left one pixel for sub-frame D. These four shifts occur at a fast enough rate to prevent perceived flicker. After sub-frame D is displayed, sub-frame A is displayed again and the process of displaying the sub-frames repeats, in the order A, C, B, and D.

When a four-position resolution architecture is used, every pixel of the 2560×1440 image is used in one of the sub-frames. Because every pixel is used, the diamond passband filter described above in FIG. 3 is not needed. After the sub-frames are created, they can be sent to SLM 110 for display without filtering the pixels using the diamond passband filter. The filter is used to remove aliasing artifacts that occur due to the absence of frequencies associated with non-sampled pixels. Because there are no non-sampled pixels in this example, the diamond passband filter is not needed.

Figure 8:
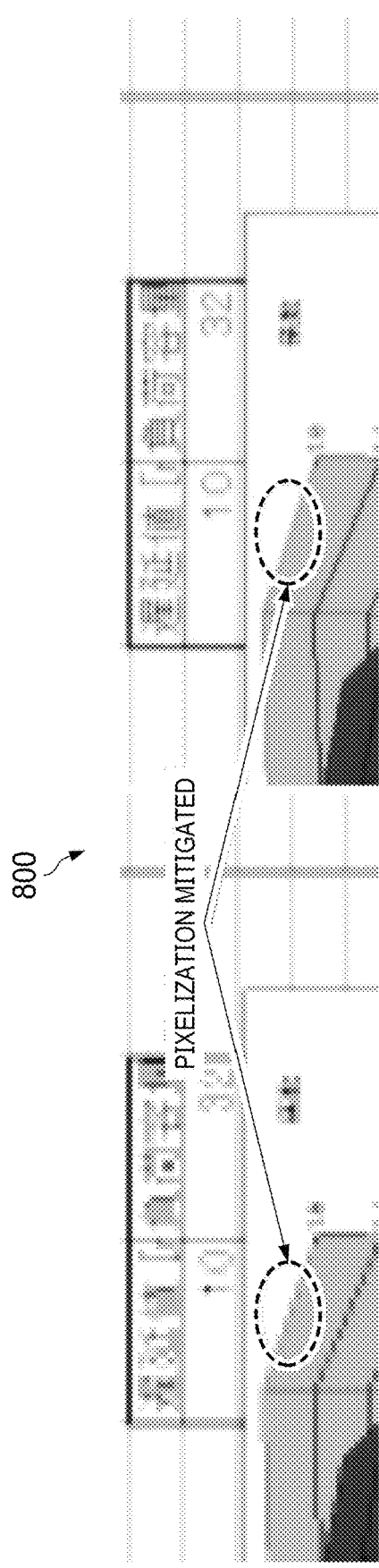
FIG. 8 is a demonstration of pixelization mitigation in accordance with various examples.

FIG. 8 is an example screenshot 800 of an existing system on the left and an optical super resolution system on the right. With the existing system, pixelization is evident along an edge of a rendered object. On the right, optical super resolution as described herein reduces the pixelization along the same edge.

Figure 9:
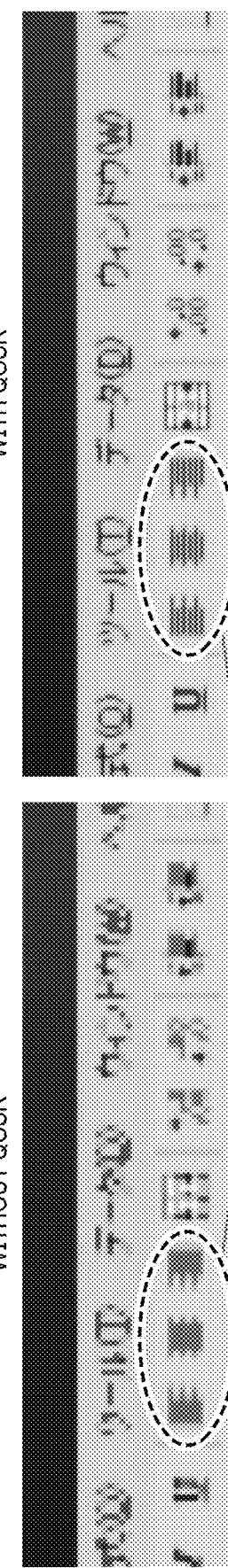
FIG. 9 is a demonstration of higher frequency rendition in accordance with various examples.

FIG. 9 is an example screenshot 900 of an existing system on the left and an optical super resolution system on the right. With the existing system, the horizontal lines in the screenshot that are separated by a single pixel are indistinguishable due to the low resolution. In contrast, the OSR system on the right creates a higher perceived resolution and the horizontal lines are distinguishable from one another, even though the lines are separated by a single pixel.

Additional techniques are used in various other examples. One technique is spatially adaptive anti-aliasing. Spatially adaptive anti-aliasing is the technique of applying anti-aliasing to only the high frequency edges of an image rather than to the entire image. This technique reduces compute load and reduces power consumption by the GPU. In the example of FIG. 8, large portions of the image are merely white space. High resolution samples are not needed in those areas because there is little display information there. Anti-aliasing can be applied around fine details or edges but not in the areas of a solid color. The examples herein are produced in a closed ecosystem as described above, so the areas of solid color within a render are known, and the areas of fine details and edges are also known. This information is used to request additional samples and apply the diamond passband filter in just the areas of the image where fine detail is needed.

Another technique that can be employed in some examples is foveated rendering. Foveated rendering is a rendering technique that uses an eye tracker integrated with the headset 100. A user perceives the highest resolution at the center of the user's gaze. Away from the center of the gaze, a user perceives much lower resolution. The center of the gaze may be only ±3 degrees in some instances. Foveated rendering tracks the location of the user's gaze and renders images in high resolution that are within the user's gaze while rendering images in lower resolution that are outside of the user's gaze. Compute load may be reduced by producing super samples and performing anti-aliasing filtering only within the user's gaze. Reducing compute load and power consumption provides benefits to AR headsets, such as increased battery life.

In another example, rather than producing a full resolution image (e.g., 2560×1440) and producing sub-frames that reduce the resolution by a factor of four, two alternating frames can be rendered that are offset by a given spatial offset. With the use of two sub-frames in the above examples, half of the pixels are used for anti-aliasing filtering but are not directly corresponding to the final output on the display because they are not part of sub-frame A or sub-frame B (e.g., pixels 220, 222, 224, 226, etc. in FIG. 2). In this example, rather than filtering down the full resolution image, sub-frame A and sub-frame B are computed directly in GPU 104. This method is referred to as a virtual lens shift approach. A virtual camera is shifted in the rendering engine. The virtual camera is shifted such that the pixels that are output are the programmed pixels for a particular sub-frame. Rather than sampling the full resolution image, two 1280× 720 frames are sent to the display. With this approach, anti-aliasing and other techniques that are performed by the rendering engine itself can be applied directly to the two sub-frames.

Figure 10:
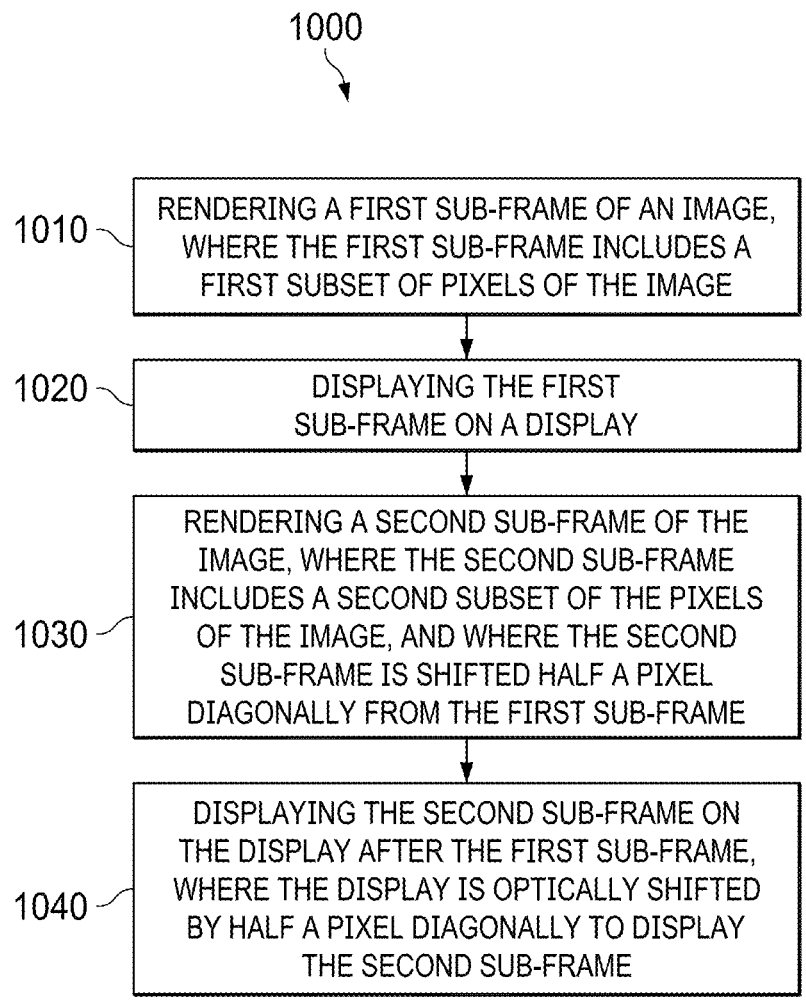
FIG. 10 is a flowchart of a method for optical super resolution in accordance with various examples.

FIG. 10 is a flowchart of an example method for optical super resolution in accordance with various examples. Although the method steps are described in conjunction with FIGS. 1-9, any system configured to perform the method steps, in any suitable order, falls within the scope of this description.

Method 1000 begins at step 1010 where a GPU such as GPU 104 renders a first sub-frame of an image, where the first sub-frame includes a first subset of pixels of the image. As described above, the first subset of pixels may include ¼ of the pixels of a high resolution image, and the first subset of pixels may include every other pixel in the odd rows of pixels of the high resolution image.

Method 1000 continues at step 1020, where the first sub-frame is displayed on a display. In an example, the resolution of the first sub-frame matches the resolution of the display. An SLM is used in some examples to project the sub-frame onto a display of a VR or AR headset.

Method 1000 continues at step 1030, where GPU 104 renders a second sub-frame of the image, where the second sub-frame includes a second subset of the pixels of the image, and where the second sub-frame is shifted a half-pixel diagonally from the first sub-frame. As described above, the second subset of pixels may include ¼ of the pixels of a high resolution image, and the second subset of pixels may include every other pixel in the even rows of pixels of the high resolution image. As seen in FIG. 2 and described above, sub-frame B is shifted a half-pixel diagonally from sub-frame A.

Method 1000 continues at step 1040, where the second sub-frame is displayed on the display after displaying the first sub-frame. The display is optically shifted a half-pixel diagonally to display the second sub-frame. As described above, the first sub-frame and the second sub-frame are displayed at a rate of 75 Hz or faster in some examples to prevent or reduce perceived flicker by a user.

Figure 11:
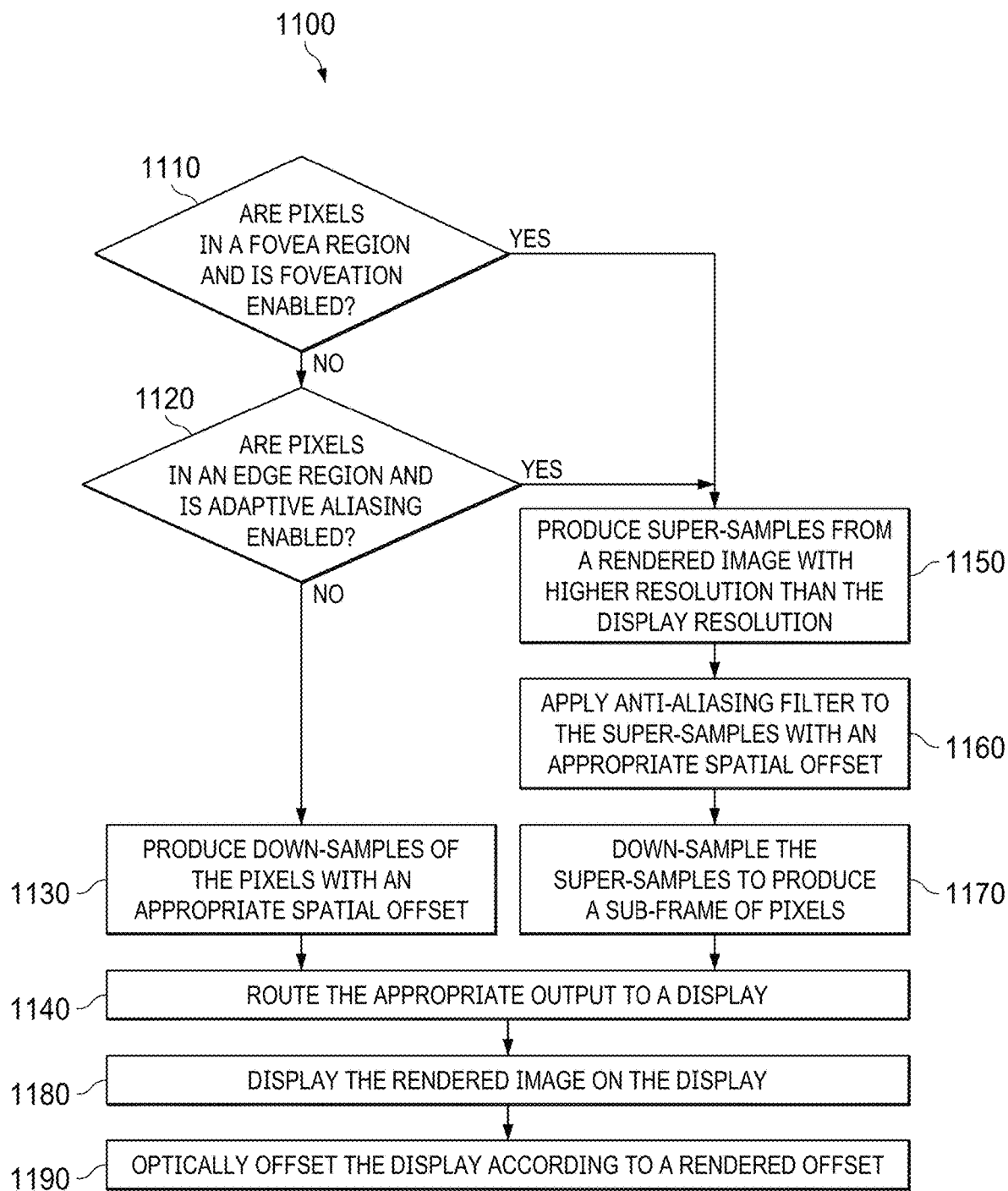
FIG. 11 is a flowchart of a method for optical super resolution in accordance with various examples.

FIG. 11 is a flowchart of an example method 1100 for optical super resolution in accordance with various examples. Method 1100 is a method for determining when to use techniques such as foveation and anti-aliasing in conjunction with higher resolution super-samples, or when to instead produce lower resolution samples when lower resolution samples are sufficient to provide an appropriate optical quality. Although the method steps are described in conjunction with FIGS. 1-9, any system configured to perform the method steps, in any suitable order, falls within the scope of this description.

Method 1100 begins at decision block 1110, where a processing unit such as GPU 104 determines if a pixel or group of pixels in an image are in a fovea region and if foveation is enabled. Foveated rendering tracks the location of the user's gaze and renders images in high resolution that are within the user's gaze while rendering images in lower resolution that are outside of the user's gaze. A sensor such as sensor 108 is used to track the user's gaze. If foveation is enabled and the pixel or pixels are in the fovea region, the method proceeds to step 1150, where higher resolution images will be rendered. If foveation is not enabled or if the pixel or pixels are not in the fovea region, the method proceeds to decision block 1120.

At decision block 1120, the processing unit determines if a pixel or pixels are in an edge region and if adaptive aliasing is enabled. If either answer is no, the method proceeds to step 1130, where lower resolution images will be rendered. If the pixel or pixels are in an edge region of the image and adaptive aliasing is enabled, the method proceeds to step 1150, where higher resolution images will be rendered.

If the answers at decision blocks 1110 and 1120 are both no, method 1100 proceeds to step 1130. At step 1130, the processing unit produces down-samples of the pixels with an appropriate spatial offset. An example of the spatial offset is shown in FIGS. 4 and 5, where sub-frames are offset by a half-pixel diagonally. After step 1130, method 1100 proceeds to step 1140.

At step 1140, the appropriate output is routed to a display such as display 112. In some examples an SLM such as SLM 110 is used to project the images onto a display. SLM 110 receives pixel information of a frame and projects the pixel information of the frame for display.

If the answer at either decision block 1110 or decision block 1120 is yes, method 1100 proceeds to step 1150. At step 1150, super-samples are produced from a rendered image with higher resolution than the display resolution. One example of a higher resolution image is the 2560×1440 image described above. In the fovea region or edge region, these super-samples provide higher resolution images to improve optical quality. After step 1150, method 1100 proceeds to step 1160.

At step 1160, the processing unit applies an anti-aliasing filter to the super-samples with an appropriate spatial offset. The application of an anti-aliasing filter is described above with respect to FIGS. 3-5. The spatial offsets are shown above with respect to FIGS. 4-5. Applying the anti-aliasing filter removes artifacts that may occur due to pixels being absent in the super-samples. After step 1160, method 1100 proceeds to step 1170.

At step 1170, the processing unit performs down-sampling. Down-sampling of the super-samples creates sub-frames, such as the sub-frames described above with respect to FIG. 2, that have an appropriate resolution for the display. After sub-frames are created in step 1170, method 1100 proceeds to step 1140.

At step 1140, the processing unit routes the appropriate output to display 112. This step includes transmitting the pixel information to an SLM 110 in one example, where SLM 110 projects the pixels for display on display 112. The output includes the appropriate pixel data for displaying an image at a rate fast enough to prevent perceived flicker from a user. After step 1140, method 1100 proceeds to step 1180.

At step 1180, the rendered image is displayed on display 112. At step 1190, the optomechanical system 122 optically offsets the display according to a rendered offset. As described above with respect to FIG. 1, the optomechanical system 122 can include an actuator that optically shifts the display by a predetermined amount for each frame that is rendered and displayed on display 112. In other examples, an optical element in headset 100 may be offset instead of display 112, such as a mirror or lens. In another example, a glass plate in a light path in headset 100 can be shifted by the actuator to provide the appropriate offset for each frame. Method 1100 repeats for each frame to be displayed on display 112.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device.

While certain components may be described herein as being of a particular process technology, these components may be exchanged for components of other process technologies. Circuits described herein are reconfigurable to include the replaced components to provide functionality at least partially similar to functionality available prior to the component replacement.

Unless otherwise stated, "about," "approximately," or "substantially" preceding a value means +/−10 percent of the stated value.

Modifications are possible in the described examples, and other examples are possible, within the scope of the claims.

What is claimed is:

1. A method, comprising:
   in response to determining, by at least one processor, that a region of pixels of an input image is in a fovea region, producing super-samples from the input image for the region of pixels to produce a rendered image;
   producing, by the at least one processor, a first sub-frame of the rendered image, wherein the first sub-frame comprises a first subset of pixels of the rendered image;
   displaying the first sub-frame to produce a first displayed image;
   producing, by the at least one processor, a second sub-frame of the rendered image, wherein the second sub-frame comprises a second subset of pixels of the rendered image, and wherein the second sub-frame is shifted a half-pixel diagonally from the first sub-frame; and
   displaying the second sub-frame to produce a second displayed image after displaying the first sub-frame, wherein the second displayed image is optically shifted a half-pixel diagonally relative to the first displayed image.

2. The method of claim 1, comprising displaying the first sub-frame and the second sub-frame at a rate of at least 75 Hertz.

3. The method of claim 1, wherein the first subset of pixels includes one-fourth of the pixels of the input image, and the second subset of pixels includes one-fourth of the pixels of the input image.

4. The method of claim 3, wherein the first subset of pixels includes every other pixel in odd rows of pixels of the input image.

5. The method of claim 3, wherein the second subset of pixels includes every other pixel in even rows of pixels of the input image.

6. The method of claim 1, further comprising:
   producing a third sub-frame of the input image, wherein the third sub-frame comprises a third subset of the pixels of the input image, and wherein the third sub-frame is shifted a half-pixel up from the second sub-frame;
   displaying the third sub-frame to produce a third displayed image after displaying the second sub-frame, wherein the third displayed image is optically shifted by a half-pixel up relative to the second displayed image;

producing a fourth sub-frame of the input image, wherein the fourth sub-frame comprises a fourth subset of the pixels of the input image, and wherein the fourth sub-frame is shifted a half-pixel diagonally from the third sub-frame; and displaying the fourth sub-frame to produce a fourth displayed image after displaying the third sub-frame, wherein the fourth displayed image is optically shifted by a half-pixel diagonally to display the fourth sub-frame relative to the third display image.

7. The method of claim 1, comprising applying an anti-aliasing filter to the first subset of pixels and the second subset of pixels.

8. The method of claim 7, comprising applying spatially adaptive anti-aliasing to an edge region of the input image.

9. The method of claim 1, wherein the region of pixels is a first region of pixels, the method further comprising:

in response to determining that a second region of pixels of the input image is outside the fovea region, producing down-samples of the second region of pixels with a spatial offset.

10. A processing unit configured to:

produce a first sub-frame of an image, wherein the first sub-frame comprises a first subset of pixels of the image, the image having the first subset of pixels, a second subset of pixels, and a third subset of pixels;

apply an anti-aliasing filter to the first subset of pixels using the third subset of pixels;

transmit the first sub-frame;

produce a second sub-frame of the image, wherein the second sub-frame comprises the second subset of pixels of the image, and wherein the second sub-frame is shifted a half-pixel diagonally from the first sub-frame;

apply the anti-aliasing filter to the second subset of pixels using the third subset of pixels; and transmit the second sub-frame.

11. The processing unit of claim 10, wherein the first subset of pixels and the second subset of pixels are in a fovea region.

12. The processing unit of claim 10, wherein the anti-aliasing filter is a 3×3 finite impulse response (FIR) filter.

13. The processing unit of claim 10, where the processing unit transmits the first sub-frame and the second sub-frame to a spatial light modulator (SLM) at a rate of at least 75 Hz.

14. The processing unit of claim 10, wherein the first subset of pixels includes one-fourth of the pixels of the image, and the second subset of pixels includes one-fourth of the pixels of the image.

15. The processing unit of claim 10, wherein the anti-aliasing filter is a diamond passband anti-aliasing filter.

16. A system comprising:

a display;

a processing unit configured to:

render an image;

produce a first sub-frame of the image, wherein the first sub-frame comprises a first subset of pixels of the image, the image having the first subset of pixels, a second subset of pixels, and a third subset of pixels;

apply an anti-aliasing filter to the first subset of pixels using the third subset of pixels;

produce a second sub-frame of the image, wherein the second sub-frame comprises the second subset of pixels of the image, and wherein the second sub-frame is shifted a half-pixel diagonally from the first sub-frame; and apply the anti-aliasing filter to the second subset of pixels using the third subset of pixels; and a spatial light modulator (SLM) coupled to the processing unit and optically coupled to the display, the SLM configured to:

receive the first sub-frame from the processing unit and project the first sub-frame to the display to produce a first projected image; and receive the second sub-frame from the processing unit and project the second sub-frame to the display to produce a second projected image, wherein the second projected image is optically shifted by a half-pixel diagonally relative to the first projected image.

17. The system of claim 16, wherein the processing unit applies the anti-aliasing filter to pixels within a fovea region in the first subset of pixels and in the second subset of pixels.

18. The system of claim 16, wherein the SLM is configured to project the first sub-frame and the second sub-frame at a rate of at least 75 Hz.

19. The system of claim 16, wherein the first subset of pixels includes one-fourth of the pixels of the image, and the second subset of pixels includes one-fourth of the pixels of the image.

20. The system of claim 16, wherein the first subset of pixels is arranged in a quincunx arrangement.

* * * * *